United States Patent [19]

Adams et al.

[11] Patent Number: 4,927,675
[45] Date of Patent: May 22, 1990

[54] FILLED CORE MATERIALS HAVING UNFILLED OUTER ATTACHED LAYERS

[75] Inventors: Ronald L. Adams, Mt. Vernon; Kirk L. Kimbel, Evansville; Clayton B. Quinn, Mt. Vernon, all of Ind.

[73] Assignee: General Electric Company, Pittsfield, Mass.

[21] Appl. No.: 342,606

[22] Filed: Apr. 21, 1989

Related U.S. Application Data

[63] Continuation of Ser. No. 814,960, Dec. 31, 1985, abandoned.

[51] Int. Cl.⁵ .................. B32B 27/08; B32B 27/36; B27N 5/00
[52] U.S. Cl. ......................... 428/35.9; 428/215; 428/324; 428/325; 428/328; 428/206; 428/207; 428/297; 428/413; 428/412; 428/480; 428/483; 428/31; 264/171
[58] Field of Search .............. 428/35.9, 206, 207, 428/297, 215, 324, 325, 328, 414, 412, 480, 483

[56] References Cited

U.S. PATENT DOCUMENTS

| | | | |
|---|---|---|---|
| 3,276,943 | 10/1966 | Kawamura | 161/162 |
| 3,423,498 | 1/1969 | Lefevre | 264/171 |
| 3,448,183 | 6/1969 | Chisholm | 264/37 |
| 3,515,626 | 6/1970 | Duffield | 264/210 |
| 3,645,822 | 2/1972 | Widiger et al. | 156/243 |
| 3,959,432 | 5/1976 | Wiley | 264/171 |
| 4,045,603 | 8/1977 | Smith | 428/2 |
| 4,111,349 | 9/1978 | Buckler | 428/516 |
| 4,255,219 | 3/1981 | Dellavecchia | 428/297 |
| 4,402,889 | 6/1983 | Bonis | 264/37 |
| 4,474,845 | 10/1984 | Hagerman et al. | 428/297 |
| 4,477,521 | 10/1984 | Lehmann et al. | |
| 4,540,623 | 9/1985 | Im et al. | 428/412 X |

FOREIGN PATENT DOCUMENTS 57-34952 2/1982 Japan .
58-189282A 4/1982 Japan .

*Primary Examiner*—P. C. Ives
*Attorney, Agent, or Firm*—Spencer D. Conard

[57] ABSTRACT

Improved composite materials are disclosed, in which a thermoplastic core layer has at least one inorganic or organic constituent dispersed therein. A first coextruded thermoplastic outer layer is attached to a first surface of the core layer, and is substantially free of dispersed inorganic and organic constituents, while a second coextruded thermoplastic outer layer is attached to a second surface of the core layer and is also substantially free of dispersed inorganic and organic constituents.

12 Claims, No Drawings

FILLED CORE MATERIALS HAVING UNFILLED OUTER ATTACHED LAYERS

This is a continuation of application Ser. No. 814,960 filed Dec. 31, 1985 now abandoned.

The present invention relates in general to composite materials and more particularly to new and improved coextruded composite materials which may be made into film, sheet, or shaped articles, as well as to a method for preventing the migration of constituents dispersed in the core layer of the material to portions of the outer layers of the material which contact subsequently applied inks and coating materials.

BACKGROUND OF THE INVENTION

Thermoplastic materials often contain high levels of colorants, reinforcing agents, and other constituents to impart certain desired properties to the finished articles. These materials are typically monolayered and are extruded into various shapes by well-known methods. Although the extruded materials exhibit good overall properties when lower levels of colorants or reinforcing agents (e.g., less than about 10% by weight for glass; less than about 0.5% nonvolatile weight for some colorants) are incorporated, several serious problems arise when higher levels of the colorants and/or reinforcing agents are added. For instance, the colorants, especially the organic dyes, are susceptible to plateout, which is a migration of the colorants from the interior of the extruded material to the surface of the material during and following the extrusion process. These colorants may then become deposited on the hot chrome polishing roll and other metal surfaces of the extruder, resulting in scratches and excessive wear on the roll surface, as well as causing excessive smoking in the vicinity of the hot extruder. Moreover, the deposited colorants may contaminate other materials which may be subsequently extruded. Furthermore, the colorants (as well as certain stabilizers and processing aids) may bleed, i.e., migrate to the surface, and react with subsequently applied coatings or inks, thereby resulting in undesirable color changes, printing smudges, and possible delamination of the subsequently applied materials. Moreover, the propensity for colorants to migrate to the surface of the material necessitates high loading levels of colorants to compensate for optical deficiencies which would result from reduced colorant levels in the interior of the material. Since colorants are generally expensive materials, the cost for incorporating such high levels is high.

When reinforcing agents, especially glass filaments, are included at levels of above about 10% by weight in the composition being extruded, they tend to break through the surface of the monolayer material and cause abrasions die lines, grooves, and other imperfections which may eventually result in mechanical failure of the material. Furthermore, the reinforcing agents frequently become caught on the surface of the extruder die and in the melt pipes, thereby resulting in further wear and possible breakdown of the extruder.

OBJECTS OF THE INVENTION

Accordingly, it is the primary object of the present invention to provide extruded materials which overcome the foregoing disadvantages.

It is another object of the present invention to provide a coextruded material containing a substantial amount of reinforcing agents and/or colorants which do not come into contact with subsequently applied coatings or inks.

It is still another object of the present invention to provide a thermoplastic article which is amenable to extrusion processes.

It is yet another object of the present invention to provide a less costly thermoplastic material using reduced levels of colorants, but having the same optical and physical properties as more costly materials.

SUMMARY OF THE INVENTION

The foregoing objects are generally achieved by a coextruded multilayer material comprising a thermoplastic core layer having at least one inorganic and/or organic constituent dispersed therein; a first coextruded thermoplastic outer layer attached to a first surface of the thermoplastic core layer and substantially free of dispersed inorganic and organic constituents; and a second coextruded outer layer attached to a second surface of the core layer opposite the first surface and substantially free of dispersed inorganic or organic constituents. The thermoplastic core layer is typically a polycarbonate, as are the first and second coextruded outer layers. The inorganic and/or organic constituents dispersed in the core layer generally comprise about 1.0% by weight to about 40 % by weight of the total solids weight of the multilayer material. These constituents are generally colorants such as pigments, and reinforcing agents such as glass, as well as other adjuvants described below. Furthermore, various volatile components such as organic solvents and plasticizers may be included in the core layer.

The first and second coextruded outer layers are attached, respectively, to the first and second surfaces of the core layer, and are each substantially free of dispersed inorganic and organic constituents, as will be discussed below. Each layer has a thickness sufficient to prevent the migration of inorganic or organic constituents dispersed in the core layer to portions of each outer laer which conact subsequently applied inks or coating materials. The multilayer material of the present invention generally exhibits excellent mechanical and optical properties while overcoming the defects of prior art monolayer materials which may damage the extruder or auxiliary equipment and allow colorants and reinforcing agents to react unfavorably with subsequently applied inks or coatings.

DETAILED DESCRIPTION OF THE INVENTION

The core layer of the coextruded multilayer material of the present invention may be any extrudable thermoplastic material. Examples of typical thermoplastic materials suitable for the core layer include, but are not limited to, polyolefins, poly(aryl ethers), poly(aryl sulfones), polyetherimides, polyamides, epoxy-based polymers, thermoplastic polyurethanes, alkenyl aromatic polymers, nitrile barrier resins, polycarbonates, acrylic-based polymers, thermoplastic polyesters, etc., as well as halogenated thermoplastics and copolymer blends of the above-mentioned polymers. All of these polymers are well-known to those skilled in the art. Many of them are described, for example, in U.S. Pat. No. 4,080,356. Preferred polymers for the core material are thermoplastic linear polyester resins such as poly(ethylene terephthalate) (PET) and poly(1,4-butylene terephthalate) (PBT), as wel as polycarbonates, all of which exhibit excellent physical properties and surface appearance after extrusion. A suitable PBT resin for the present invention is commercially available from General Electric Company as VALOX® 315 resin. PBT is typically formed by the polycondensation of 1,4-butanediol and dimethyl terephthalate or terephthalic acid. A more detailed description of the preparation of PBT is given in U.S. Pat. No. 4,329,444, issued to the assignee of the present invention. Polycarbonates, such as General Electric's Lexan® resin, are especially preferred for the core material of the present invention. Polycarbonates suitable for the present invention are typically formed by the reaction of aromatic dihydroxy compounds with phosgene or with carbonate precursors such as diaryl carbonates. Methods for the preparation of polycarbonates are well-known and are described, for example, in U.S. Pat. No. 4,351,920.

The molecular weight of the polymer used for the core material will vary depending on the structure of the particular polymer and upon the particular physical requirements for the coextruded material. A preferable molecular weight range for PBT as used herein is from about 20,000 to about 30,000, whereas a preferable molecular weight range for the polycarbonate is from about 10,000 to about 70,000. The higher molecular weights would be suitable for materials requiring greater tensile strength, such as automobile bumper components. The thickness of the core material of the present invention also depends upon a variety of factors such as the end use of the material, its required tensile strength and elasticity, and the thickness of the coextruded first and second outer layers which are described below. The thickness may range from about 1 mil to about 200 mils or higher, though typically, the thickness ranges from about 20 mils to about 90 mils for most commercial applications.

The inorganic or organic constituents dispersed within the core laer are selected from the group consisting of colorants, fillers, reinforcing agents, impact strength modifiers, stabilizers, processing aids, and the like, as well as combinations thereof. All of these constituents are well-known to those skilled in the art and are described in whole or in part in the following references: The Condensed Chemical Dictionary, Tenth Edition, Van Nostrand Reinhold Company, 1981; Kirk-Othmer Encyclopedia of Chemical Technology, Third Edition, 1982; and the Modern Plastics Encyclopedia, McGraw-Hill Incorporated, Volume 56, Number 10A, October, 1979.

The colorants impart color to the material and are typically either dyes or pigments. The dyes are described in Volume 8 of the Kirk-Othmer reference listed above, pp. 159–408, as wel as on pp. 154–166 of the Modern Plastics Encyclopedia listed above. Typical of the dyes which are suitable for the core layer are anthraquinone, azo, nigrosine, acid, basic, chrome, and direct dyes. The selection of a particular dye will depend upon the particular color and brightness requirements, as well as upon the light fastness and migration tendencies of each dye.

A wide variety of pigments in various forms may also be used in the core layer of the present invention. Among the inorganic pigments which may be used are metallic oxides (iron, titanium, chromium, etc.), earth colors (siennas, etc.), lead chromates, metal powder suspensions (gold, aluminum), and carbon black. Among the organic pigments possible for the present invention are animal-based and vegatable-based pigments, as well as synthetic pigments, such as phthalocyanine, lithols, toluidine, para red, toners, lakes, etc. The selection of a particular pigment will of course depend upon a choice of color to be imparted to the material, as well as upon processing conditions, compatibility with polymers used for the core material, light fastness, and migration tendency. Titanium dioxide is typically used as a base pigment in the core layer of the present invention because of its opaqueness and its ability to additionally function as a filler material.

Many liquid colorants, i.e., fine dispersions of pigments in a fluid matrix, are also suitable for the present invention. Furthermore, color concentrates, which are intimately mixed dispersions of pigments and other additives in a resin system, are also especially suitable for the core layer because they allow for higher loadings of pigment into the material. Typically, the concentrate is blended with one or more resins in predetermined weight proportions to produce the desired color and opacity in the end material. Special colorants may also be included in the core layer, such as fluorescents, peralescents, metallics, and phosphorescents. Care must be taken to insure that any of the above-described colorants are amenable to the particular thermoplastic material of the core layer and first and second outer layers, as well as being unaffected by extrusion temperatures, by other molding conditions, and by exposure to ultraviolet light. Methods of dispersing the colorants in the polymeric material forming the core layer are well-known, and typically consist of careful additions of such colorants to the molten core layer material prior to the time the material enters the coextruder barrel.

Various well-known fillers may also be included in the core layer of the present invention. Such filler materials include silicates (i.e., clay, kaolin and mica,), calcium carbonate, alumina trihydrate, silicas, barytes, and slate flour, all well-known in the art and described, for example, in the Modern Plastics Encyclopedia and The Condensed Chemical Dictionary references mentioned above. The selection of particular fillers will of course depend in part upon the level of stiffness and hardness desired in the material.

Various well-known impact strength modifiers may also be added to the core layer of the present invention. Among the suitable impact modifiers are elastomeric polymers and copolymers typically used for thermoplastic compositions, some of which are described in U.S. Pat. No. 4,525,508, assigned to the assignee of the present invention and incorporated by reference herein. For instance, the modifier of the present invention may be an elastomeric polymer or copolymer formed from alternating polymer units of a vinyl aromatic hydrocarbon and a conjugated diene. Exemplary commercial elastomeric resins suitable for the present invention include the polystyrene-polybutadiene-polystyrene resins manufactured by Shell Chemical Company. Especially preferred impact modifiers include the high molecular weight and low molecular weight styrene-butadiene-styrene block copolymers from Shell Chemical Company, in which the butadiene block is hydrogenated, yielding styrene-ethylene-butylene-styrene block copolymers (SEBS). The preparation of hydrogenated block copolymers is described in U.S. Pat. No. 3,431,323. Other suitable modifiers include radial teleblock copolymers of a vinyl aromatic compound, a conjugated diene and a coupling, as disclosed in U.S. Pat. No. 4,525,508. Yet another suitable modifier is an acyrlic resin modified diene rubber-containing resin, e.g., resinous compositions of poly(alkyene methacryalte) grafted onto a butadiene-styrene copolymer backbone or an acrylonitrile-butadiene-styrene terpolymer backbone, etc. Some of these and other suitable impact modifiers are further described in detail in U.S. Pat. No. 4,525,508. Moreover, any other organic polymer-type material which will enhance the impact strength properties of plastics and which is compatible with the core layer and outer layer materials of the present invention may be used herein.

Various well-known processing aids may also be included in the core material of the present invention. Such aids include viscosity depressants, such as ethoxylated fatty acids; mold-release agents such as waxes, silicones, fluoroplastics, polyethylene, etc.; and emulsifiers of the anionic-, cationic-, and nonionic-type, such as quaternary ammonium compounds, polyethylene glycol, etc., for example. As in the case of the other inorganic or organic dispersed constituents, the amount and type of processing aid included in the core material will depend upon the type of extrusion techniques being utilized and upon the compatibility of the particular processing aid with the polymeric materials forming the core layer and outer layers.

Various well-known antioxidants may be included in the core layer of the present invention. The particular antioxidant depends upon the polymeric system forming the core layer. For instance, polycarbonate materials may require the use of phenolic phosphite derivatives to prevent oxidatively-induced discoloration. Other antioxidants used in thermoplastics include materials such as substituted phenolic compounds, hindered phenols, organometallic compounds derived from metals such as lead, barium, etc., and salts of copper and/or manganese. Typical antioxidants suitable for the present invention Irganox 1076 and Irgafos 168, both products of Ciba Geigy Company. The type and level of antioxidant will depend upon the physical requirements of the final product.

Various reinforcing agents may also be added to the core layer of the present invention to enhance physical properties such as tensile strength and impact strength. Among the various well-known reinforcing agents useful in the present invention are glass fibers, metal fibers, aramid and carbon fibers, as well as mixtures of the above agents. Furthermore, glass spheres and metal whiskers and particles may also be included in the core layer. The multilayer material of the present invention is especially amenable to the inclusion of elongated glass filaments when very high tensile strength is desired, since such filaments may easily be incorporated into the material without causing defects in the material or damaging the extrusion machinery, as described below. The filamentous glass used for reinforcement is well-known to those skilled in the art, and includes borosilicate glass, for example. The filaments may be made by well-known processes such as mechanical pulling.

Various other additives may be included in the core layer of the present invention, such as heat stabilizers, flame retardants, and antistatic agents, among others. Those skilled in the art will recognize that some of the above-described constituents may contain volatile adjuvants, or may be themselves be somewhat volatile. Such constituents would also be included in the description of volatile components below.

Various volatile components may also be incorporated into the core layer of the present invention. Non-limiting examples of such components are organic solvents, inorganic solvents, plasticizers, ultraviolet light (UV) absrobers, foaming agents, blowing agents, and combinations thereof. The level of such volatile components depends upon the chemical nature and degree of volatility of the particular component, and upon the end use contemplated for the material. For instance, the amount of ultraviolet light absorber (if present) in the core layer of the present invention typically ranges from about 0.01% by weight to about 20% by weight of the total weight of the multilayer material.

The total amount of inorganic or organic constituents dispersed in the core layer generally ranges from about 1.0% by weight to about 40% by weight of the total weight of the multilayer material, each weight percentage as used herein being based on the weight of the nonvolatile portion of the constituent, if the constituent contains both volatile and nonvolatile portions. A "substantial amount" of inorganic or organic constituents as defined for the present invention thus is any amount of inorganic or organic constituents which is capable of migrating from the core layer to the next adjacent layer, which is generally the amount within the above-described range. The actual amount of constituents in the core layer will of course depend upon the particular nature and function of the constituent. For instance, some of the nonvolatile constituents such as titanium dioxide may typically be present in the core layer at levels ranging from about 10% by weight to about 40% by weight.

The first and second coextruded outer layers attached to the first and second surfaces, respectively, of the core layer of the present invention may be formed from any thermoplastic materials which are transparent and which are physically and chemically compatible with the core layer. For example, each outer layer may be a transparent thermoplastic polyester such as poly(ethylene terephthalate) in its completely amorphous form, surrounding a core layer of poly(butylene phthalate) or polycarbonate. Also, the first outer layer may be formed from polycarbonate while the second outer layer is formed from a poly(methyl methacrylate)-type polymer, or vice versa. In applications where a heat-resistant and weather-resistant product having high impact strength, high dielectric strength, low water absorption, and good dimensional stability is desired, it is preferred that the first and second coextruded outer layers each be formed from polycarbonate when the core layer is formed from polycarbonate.

It is essential to the practice of the present invention that the first and second coextruded outer layers each be substantially free of inorganic or organic constituents. "Substantially free" as used herein is defined as any amount of inorganic or organic constituents which is incapable of migrating to portions of each outer layer which contact subsequently applied inks, coatings, or other surfaces, and/or which is incapable of reacting adversely with such subsequently applied materials, and is generally a total amount of the nonvolatile portions of the constituents which is approximately 0.5% or less of the total weight of the multilayer material. Such levels of 0.5% by weight or less of the constituents generally do not result in the problems exhibited in prior art monolayer materials, i.e., unfavorable reaction of the constituents with subsequently applied coatings or inks, deposition of the constituents on the chrome polishing roll of the extruder, etc. Constituents which have larger migratory tendencies, i.e., those tending to diffuse more quickly through the interior of the outer layers to the outside surface of the outer layers, should only be present, if at all, at even smaller levels in the outer layers, i.e., less than about 0.1% of their nonvolatile weight, especially in instances where such constituents would adversely react with subsequently applied inks or coating materials. For instance, some of the dyes described above may only be present in the outer layers at levels of about 0.1% of their nonvolatile weight, or less. Conversely, materials with lower migratory tendencies, such as some of the solid pigments, e.g., titanium dioxide, may be present in the outer layers at levels of up to about 2% by weight, although the proper maximum level will depend upon the migratory tendency of the particular constituent, as well as its potential reaction with materials subsequently applied to the outer layers. Furthermore, "substantially free" as used herein does not exclude certain ultraviolet light absorbers and antioxidants at levels that either do not result in an adverse reaction with materials subsequently applied to the outer layers or are not sufficient to migrate to the outer surfaces of the outer layers. For instance, a modified benzophenone ultraviolet light absorber such as Uvinul 5411 may be present in each outer layer at up to about 0.3% nonvolatile weight, based on the weight of the outer layer. Also, an antioxidant such as Irgafos 168 may be present in each outer layer at up to about 0.3% nonvolatile weight, based on the weight of the outer layer. Those skilled in the art will be able to readily determine appropriate levels of addition for other ultraviolet light absorbers and antioxidants without undue experimentation.

In the practice of the present invention, the first and second outer layers should each have a thickness sufficient to prevent the migration of the inorganic or organic constituents dispersed in the core layer to portions of each outer layer which contact subsequently applied inks, coating materials, or other surfaces. Typically, the thickness of each outer layer ranges from about 0.5 mil to about 30 mils, and each outer layer need not have a thickness equal to that of the other outer layer. Since one of the purposes of the outer layers is to function as a barrier or containment layer separating organic or inorganic constituents in the core layer from inks or coating materials applied to the outer surface of the multilayer material, thicker outer layers (within the above-prescribed ranges) would be used for constituents having greater migratory tendencies, such as certain silicon fluids, e.g., Silicone Fluid CF-1142 from General Electric Company. Thus, during processing of the multilayer material, some of the constituents in the core layer may begin to migrate through portions of the outer layers, but will not reach the outer surfaces of the outer layers, i.e., the outer surface of the multilayer material. For instance, glass filaments contained in the core layer may begin to separate and contact interior portions of each outer layer due to stresses caused by the extrusion process, but the outer layers will each have a thickness sufficient to prevent the filaments from completely breaking through the outer layers and contacting the extruder die surfaces.

The migration of inorganic or organic constituents dispersed in the core layer of the extruded thermoplastic material to surfaces adjacent the surfaces of the extruded thermoplastic material is thus prevented by coextruding the thermoplastic material having inorganic constituents, organic constituents or mixtures thereof with the first outer layer of a thermoplastic material substantially free of dispersed inorganic and organic constituents, said outer layer attached to a first surface and acting as a barrier to the migrating constituents. Furthermore, the second outer layer of a thermoplastic material substantially free of dispersed inorganic and organic constituents may then be coextruded on a second surface of the thermoplastic material having the constituents dispersed therein and being opposite the first surface of the material, the second outer layer also acting as a barrier to the migrating constituents.

Coextrusion apparatuses which may be used to form the multilayer material of the present invention are well-known in the art and are generally described, for example, on page 284 of the Modern Plastics Encyclopedia reference mentioned above.

The multilayer material of the present invention having a substantial amount of at least one inorganic or organic constituent dispersed in the core layer exhibits substantially the same optical characteristics as monolayer materials, as shown by the transmission and color spectra described below. Furthermore, to the human eye, the multilayer material of the present invention is identical to the monolayer materials of the prior art.

Although the material of the present invention may exhibit somewhat lower impact strength and tear resistance as compared to monolayer materials, these properties may be enhanced by one of several methods. In those instances in which constituents in the core layer do not have high migratory tendencies, the thickness of each outer layer may be decreased so that reinforcing agents (if present) in the core layer may increase the overall strength of the multilayer material. Also, the level of reinforcing agent in the core layer may be increased, with the proviso that each outer layer still retain a sufficient thickness to prevent core layer constituents from reaching the surface of the multilayer material. Moreover, a layer of a reinforcing material which enhances impact strength and tear resistance might be coextruded simultaneously with the outer surfaces of the multilayer material. For instance, polymeric materials such as copolyesters and copolyetheresters have excellent tear strength, flex-life, toughness, and impact strength. Those copolyesters and copolyetheresters which have an amorphous, transparent form are suitable for the present invention. Copolyesters and copolyetheresters are well-known in the art and are described, for example, in U.S. Pat. Nos. 3,023,192; 3,651,014; 3,763,109; 3,766,146; 3,784,520; 3,801,547; 4,156,774; 4,264,761; and 4,355,155. These materials may be modified with PBT and a monoalkenyl arene-conjugated diene copolymer, if desired. The thickness of these additional reinforcing layers will depend upon the thicknesses of the core layer and the first and second outer layers, as well as depending upon the amount of inorganic reinforcing constituents in the core layer. For example, reinforcing layers having thicknesses of from about 0.5 mils to about 15 mils may be applied on top of each coextruded outer layer when the thickness of each outer layer is about 10 mils and the thickness of the core layer is about 130 mils, the core layer having about 40% by weight of a reinforcing agent such as glass filaments. The reinforcing layers are substantially free of dispersed inorganic and organic constituents as defined above, although they may include ultraviolet light absorbers and antioxidants at levels described above for the outer layers, and in those instances, the ultraviolet light absorbers and antioxidants may be excluded from the outer layers. Furthermore, it is within the scope of the present invention to attach the reinforcing layer to only one of the outer layers or to both outer layers.

It is within the scope of the present invention to apply a coating material on the first and second outer layers (i.e., after coextrusion of the multilayer material) in those instances in which additional physical properties are desired, such as abrasion resistance. The coating material is generally a conventional coating which is air-dried or cured by the application of heat, although it may also be a radiation-curable coating. Typical examples of conventional thermoplastic coating materials suitable for this application are acrylic-based lacquers. Typical examples of conventional heat-curable thermosetting coating material suitable for this application include phenolics, alkyds, polyesters, epoxies, amino resins such as melamines, and silicones, etc. Typical radiation-curable coatings are described in the Kirk-Othmer Encyclopedia of Chemical Technology, Third Edition, Volume 19, 1982, pp. 607-622. The only proviso for the coating material is that it be physically and chemically compatible with the first and second outer layers. The coating materials may be applied to the first and second outer layers by various methods well-known in the art, e.g. spraying, brushing, roll coating and the like. Furthermore, the coating materials may contain a very wide range of various inks, dyes and pigments because the characteristics of these colorants will be unaffected by the inorganic or organic constituents which are confined within the thermoplastic core layer of the present invention. Moreover, those skilled in the art will realize that such coating materials optionally having colorants contained therein may also be applied to the above-described reinforcing layers which may be attached to the first and second outer layers of the present invention.

The coextruded multilayer material of the present invention is very suitable for a large number of uses. For instance, the invention may be used in the graphics industry as a thin substrate upon which there may be applied a wide variety of coating materials and printing inks, since these materials are in no danger of contacting inorganic or organic constituents confined in the core layer of the multilayer material. The only restriction for the inks and coating materials is that they be chemically compatible with the particular polymeric material used to form the first and second outer layers (or reinforcing layers, if present) of the present invention. An example of a silkscreen ink which may be used in printing on the material of the present invention is ASG-EXCELSET, made by Advance Process Supply Company. Various other types of inks may be applied to the present invention, such as offset, flexographic, UV-curable, and electrically conductive, all well-known in the art. Furthermore, the present invention can also be thermoformed to form thin sheets or molded parts such as automobile bumpers, bumper attachments, and interior moldings and fixtures for automobiles. The matching of the color of the multilayer material of the present invention to adjacent articles of plastic, rubber, or metal is simplified because the formulated color of the multilayer material is not altered by constituents in the core reacting with subsequently applied inks or coatings.

It is also within the scope of the present invention that the multilayer material be a tubular thermoplastic core material having at least one inorganic or organic constituent dispersed therein, and a first coextruded outer layer attached to the outer surface of the tubular core material, the outer layer being substantially free of inorganic or organic constituents. The core material and outer layer material may be formed of any of the polymers mentioned above for the core material and outer layers of the preferred embodiments. Furthermore, the core material may contain any of the inorganic or organic constituents described above, as well as the volatile components described above. The outer layer may have an ink pattern printed on its surface, and it has a thickness sufficient to prevent the migration of the inorganic or organic constituent dispersed in the core layer to portions of the outer layer which contact subsequently applied inks or coating materials.

The following specific examples describe the novel material of the present invention. They are intended for illustrative purposes of specific embodiments only and should not be construed as a limitation upon the broadest aspects of the invention.

EXAMPLE 1

Sample 1 was an extruded material outside the scope of the present invention and consisted of a layer of Lexan ® resin sheet material, a polycarbonate manufactured by General Electric Company. The layer was 20 mils thick and contained therein 10% by weight of titanium dioxide. Sample 2 was within the scope of the present invention and was formed by coextruding first and second outer layers attached to each side of the layer of resin sheet material (i.e., now a core layer) of sample 1. Each outer layer had a thickness of about 1-3 mils and was formed of Lexan resin substantially free of inorganic or organic constituents, but containing 0.3% by nonvolatile weight of an ultraviolet light absorber and 0.03% of an antioxidant. Color spectra were obtained for each sample by using a Diano Spectrophotometer Match Scan II. The color spectra was shifted less than 0.1 $\Delta E$, indicating that the attachment of the first and second outer layers did not appreciably affect the color characteristics of the material as compared to the monolayer of Sample 1.

EXAMPLE 2

Sample 3 was a monolayer material of Lexan resin outside the scope of the present invention having a thickness of about 20 mils and containing therein about 1.0%-1.5% by nonvolatile weight of a red colorant mixture consisting of 0.05%-0.2% by nonvolatile weight of an anthraquinone dye and 0.5%-0.9% by nonvolatile weight of a perione dye. The addition of the colorant mixture was adjusted to match a color standard designated as 6148. The material was then run for about 35 minutes through an extruder in a polishing mode (i.e. a mode for a high-gloss finish) before plateout onto the surface of the top and bottom polishing rolls occurred. After the rolls were cleaned, the material was run through the extruder again for about 30 minutes before plateout once again became severe.

Sample 4 was within the scope of the present invention and included a core layer approximately 26 mils thick formed from the Lexan polymer used for sample 3. As in sample 3, the core layer contained about 1.0%-1.5% by nonvolatile weight of a red colorant consisting essentially of about 0.05%-0.2% by nonvolatile weight of an anthraquinone dye and about 0.5%-0.9% by nonvolatile weight of a perione dye. The core layer was coextruded on an experimental line with first and second outer layers of Lexan resin attached thereto. Each outer layer was about 2 mils thick and was substantially free of the pigment and dye systems used in the core layer, as well as being substantially free of other inorganic and organic constituents, but containing 0.3% of a UV absorber and 0.03% of an antioxidant. It was determined that the color of sample 4 was too dark to be matched to the standard 6148.

Sample 5(a) was a variation of sample 4 (and also within the scope of the present invention) in that the thickness of the core layer was reduced to about 20 mils while the thickness of each outer layer was increased to about 5 mils. The same materials were used in sample 5(a) as in sample 4, i.e., a core layer having contained therein about 1.0%-1.5% by nonvolatile weight of a red colorant mixture consisting essentially of 0.05%-0.2% by nonvolatile weight of an anthraquinone dye and 0.5%-0.9% by nonvolatile weight of a perione dye, with the first and second outer layers being substantially free of inorganic and organic constituents, but containing 0.3% of a UV absorber and 0.03% of an antioxidant.

Sample 5(b) was also within the scope of the present invention and was formed by the coextrusion method used to form the previous samples. The same materials were used as in sample 5(a), but greater thicknesses were used for sample 5(b) i.e., the core layer (having the same proportionate amount of inorganic and organic constituents therein as in sample 5(a)) was 20 mils thick while each outer layer was 20 mils thick. In both samples 5(a) and 5(b), the measured thickness of the entire multilayer material deviated no more than ±5% from its specified thickness, while the measured thickness of each core and outer layer deviated no more than ±10% from their specified thickness.

A spectrophotometer was used to measure light transmission, haze, and gloss for samples 5(a) and 5(b). The following results were obtained:

|  | Sample 5(a) | Sample 5(b) |
| --- | --- | --- |
| Light Transmission[a] | ≧5% | ≧5% |
| Haze | ≦3% | ≦3% |
| Gloss[b] 60° unpainted | 140 | 140 |
| Gloss[c] 60° painted | 75 | 75 |

[a]Light transmission as measured by Gardner Laboratory XL235 Colorimeter.
[b]Gloss measured using a Pacific Scientific Gardner Neotec Glossgard II.
[c]"Painted": A flat black lacquer is painted on the bottom surface of the material to provide an opaque background.

The color of the multilayer material of sample 5(a) and 5(b) successfully matched the color of the standard 6148. Samples 5(a) and 5(b) were each coextruded for about 4 hours and 20 minutes without any plateout of the colorant contained in the core layer. Furthermore, each coextruded material exhibited high gloss throughout the experimental run.

Sample 6 was also within the scope of the present invention. The thickness of each outer layer was about 1 mil, and the core layer had a thickness of about 28 mils. The composition of each layer was identical to that in the corresponding layers of sample 4, 5(a) and 5(b). Sample 6 was run through the coextruder for about 3 hours. There was no evidence of plateout of the constituents in the core layer. Since such comparatively thin outer layers proved to be an effective containment for the core layer constituents, those skilled in the art will realize that even more aggressive inks (i.e., having a greater tendency to react unfavorably with inorganic or organic core constituents) such as Wiederhold XL, a product of the Color Mix Corporation, may be utilized for printing on the material of the present invention.

EXAMPLE 3

Sample 7 was a coextruded multilayer material within the scope of the present invention with a core layer of Lexan resin having contained therein 0.8% by weight of an anthraquinone dye and having a thickness of about 26 mils. The outer layers also consisted of Lexan resin, but were substantially free of inorganic and organic constituents, though they did contain 0.3% of a UV absorber and 0.03% of an antioxidant. Each outer layer had a thickness of about 2 mils. Sample 8 was also within the scope of the present invention and contained the same layers and compositions as sample 7, although the coextruded material is much thicker, with the core layer having a thickness of about 187 mils and each outer layer having a thickness of about 14 mils. The core layer contained proportionately the same amount and type of colorant constituents as sample 7. Sample 9 was outside the scope of the present invention and consisted of a monolayer of Lexan resin having contained therein 0.8% by weight of an anthrquinone dye and having a thickness of about 30 mils.

Samples 7, 8 and 9 were all run through pre-production extrusion lines (in contrast to the experimental extrusion lines used for samples 1–6). Various physical tests were performed on each sample after extrusion (ASTM test methods used as indicated). The following results were obtained:

|  | Sample 7 | Sample 8 | Sample 9 |
| --- | --- | --- | --- |
| Tensile Strength at Yield (psi)[a] | 8,400 | 8,400 | 8,500 |
| Tensile Strength at Break (psi) | 10,200 | 10,200 | 9,800 |
| Elongation at Break % | 70–90 | 60–90 | 70–90 |
| Flexural Strength (psi)[b] | 13,500 | 13,500 | 13,500 |
| Flexural Modulus (10⁵ psi) | 3.40 | 3.40 | 3.40 |
| Heat Distortion Temperature[c] | | | |
| at 264 psi(°F.) | 275 | 260–280 | 275 |
| at 66 psi(°F.) | 285 | 280 | 285 |
| Coefficient of Thermal Expansion (in/in/°F.)[d] | 0.000038 | 0.000038 | 0.000038 |
| Water Absorption, 24 hours[e] (wgt. H₂O/total weight) × 100 | 0.15–0.35 | 0.15–0.35 | 0.15–0.35 |
| Specific Gravity[f] | 1.20 | 1.20 | 1.20 |

[a]D638 (ASTM)
[b]D790 (ASTM)
[c]D648 (ASTM)
[d]D696 (ASTM)
[e]D570 (ASTM)
[f]D1505 (ASTM)

The test values for samples 7 and 8, which are within the scope of the present invention, as compared to the prior art monolayer material of sample 9, indicate that the properties of the coextruded multilayer material are substantially the same as or better than the properties of the prior art material.

EXAMPLE 4

Sample 10 was a multilayer material of the present invention having a core layer thickness of about 16 mils and outer layers of Lexan resin with thicknesses of about 2 mils each. The core layer was also made of Lexan resin and contained therein about 1.3%–1.5% by nonvolatile weight of a colorant mixture of 0.9%–1.1% anthraquinone dye and 0.3%–0.5% perione dye. Sample 11 was made of the same layers and material as sample 10, but the core layer had a thickness of about 24 mils while each outer layer had a thickness of about 3 mils. The core layer contained the same type and proportionate amount of dye and colorant as in sample 10. Sample 12 was similar in composition to samples 9 and 10; however, the core layer had a thickness of about 54 mils while each outer layer had a thickness of about 3 mils. The core layer contained the same type and proportionate amount of colorant as samples 10 and 11. Each outer layer of samples 10, 11 and 12 was substantially free of inorganic and organic constituents except for the UV absorbers and antioxidants discussed above.

Samples 10, 11 and 12 were run on a commercial coextrusion apparatus typically used for graphic products. A commercial white ink was printed on the top surface (i.e. on the outer surface of an outer layer) of each sample. The ink, commercially known as Nu Gloss Vinyl, was made by Sinclair and Valentine Company. The ink formulation was based on an acrylic-vinyl blend of polymers in a carrier solution comprising glycol esters and ketones. After printing with the ink, sample 10 showed no evidence of bleeding or ink color change. Sample 11 also showed no evidence of bleeding or ink color change. The color of sample 12 had to be adjusted to match the color of a commercial article. Sample 12 showed no evidence of bleeding or ink color change.

EXAMPLE 5

Sample 13 was a multilayer material of the present invention having a core layer thickness of 100 mils and outer layers of Lexan resin with thicknesses of about 13 mils each. The core layer was also made of Lexan resin and contained therein about 40% by weight glass fiber, while the outer layers did not contain any glass fiber. Lexan 100 is a medium viscosity polycarbonate material, and the property values listed below are standard values for the material in monolayer form. Sample 13 was run for approximately 4 hours with no evidence of die lines, plateout, roll scratches or glass hang-up in the extruder, melt pipes, or die. The following property values were obtained:

|  | Sample 13 | Lexan 100 |
| --- | --- | --- |
| Specific Gravity | 1.51 | 1.20 |
| Heat Distortion Temperature (°F.) |  |  |
| at 66 psi |  | 306 | 280 |
| at 264 psi | 293 | 270 |
| Vicat Softening$^a$ (°F.) | 330 | 310 |
| Tensile Strength (Ultimate psi) | 21,000 | 9,000 |
| Flexural Modulus (psi) | 656,000 | 340,000 |

$^a$D1525 (ASTM)

The above-listed data demonstrates an improvement in tensile strength and flexural modulus for the present invention as compared to Lexan 100. Furthermore, the above-mentioned processing disadvantages of the prior art have been overcome by the present invention.

While the invention has been described with respect to preferred embodiments, it will be apparent that many modifications, variations, changes and substitutions will now occur to those skilled in the art without departing from the spirit and scope of the invention herein. Accordingly, it is intended that the invention be limited only by the scope of the claims appended hereto.

What is claimed is:

1. A coextruded multilayer material comprising an aromatic polycarbonate core layer having a substantial amount of at least one colorant dispersed therein, said colorant being present at a level of from one percent by weight to 40 percent by weight of the total weight of said multilayer material;
   a transparent first coextruded aromatic polycarbonate outer layer attached to a first surface of the core layer and substantially free of dispersed colorants; and
   a transparent second coextruded aromatic polycarbonate outer layer attached to a second surface of the core layer opposite the first surface and substantially free of dispersed colorants, said first and second outer layers each having a thickness sufficient to prevent the migration of the colorant dispersed in said core layer to the surface portions of said first and second outer layers opposite the core layer, said first and second outer layers each having a thickness of from 0.5 mil to about 30 mils.

2. The multilayer material of claim 1 further comprising a coating material on the first and second outer layers.

3. The multilayer material of claim 2 wherein the coating material is thermosettable.

4. The multilayer material of claim 1 wherein the core layer further comprises volatile components.

5. The multilayer material of claim 4 wherein the volatile components are selected from the group consisting of organic solvents, inorganic solvents, plasticizers, ultraviolet light absorbers, foaming agents, blowing agents, and combinations thereof.

6. The multilayer material of claim 1 wherein an ink pattern is printed on the outer surface of at least one outer layer.

7. The multilayer material of claim 1 wherein the colorant is a pigment.

8. The multilayer material of claim 7 wherein the pigment is titanium dioxide.

9. The multilayer material of claim 1 wherein the colorant is a mixture of at least one dye and at least one pigment.

10. A coextruded multilayer material comprising a tubular aromatic polycarbonate core having a substantial amount of at least one colorant dispersed therein, said colorant being present at a level of from one percent by weight to 40 percent by weight of the total weight of said multilayer material; and a transparent first coextruded aromatic polycarbonate outer layer attached to the outer surface of the tubular core material, the outer layer being substantially free of colorants and having a thickness sufficient to prevent the migration of the colorant dispersed in said core to the surface portion of the outer layer opposite the core.

11. The multilayer material of claim 10 wherein the core layer further comprises volatile components.

12. The multilayer material of claim 10 wherein an ink pattern is printed on the outer surface the outer layer.

* * * * *